UNITED STATES PATENT OFFICE.

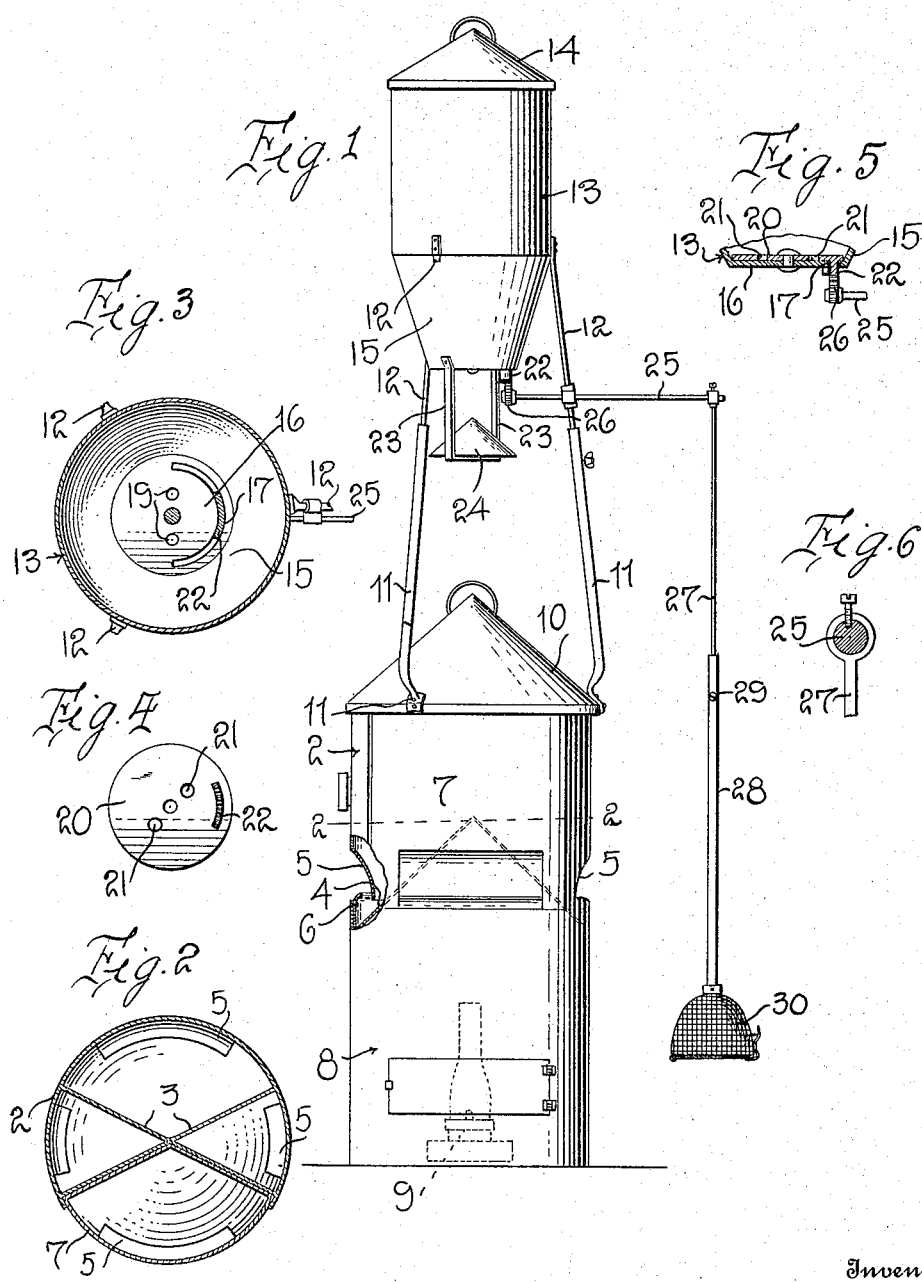

LEO M. ANDERSON AND MARY L. ANDERSON, OF OAKLAND, NEW JERSEY.

POULTRY-FEEDING DEVICE.

1,174,465. Specification of Letters Patent. Patented Mar. 7, 1916.

Application filed December 27, 1915. Serial No. 68,867.

*To all whom it may concern:*

Be it known that we, LEO M. ANDERSON and MARY L. ANDERSON, citizens of the United States, residing at Oakland, in the county of Bergen and State of New Jersey, have invented certain new and useful Improvements in Poultry-Feeding Devices, of which the following is a specification, reference being had to the accompanying drawings.

This invention relates to devices for feeding and watering poultry and particularly to certain improvements upon the combination feeder, fountain and heater illustrated in our Patent 1,102,629 granted to us on July 7th, 1914, wherein there was shown a food receptacle divided into a plurality of compartments, a water container disposed in one of the compartments, a lamp disposed beneath all of the compartments and heating the materials contained therein, and a conical cover.

The general object of our invention is to provide in combination with the parts above referred to, a grain receptacle disposed above the main body of the device and discharging more or less on to the conical cover thereof, the grain being discharged from the grain receptacle by a valve which is operated by poultry.

A further object of the invention is to provide in connection with a grain receptacle a rotatable valve controlling the outlet therefrom, this valve being adapted to be actuated by a bait supporting pendulum and in this connection, to provide means whereby the height of the bait from the ground may be readily regulated.

Still another object is to provide means whereby the height of the grain receptacle may be adjusted.

Still another object is to provide means whereby the grain receptacle may be entirely removed, if desired, from the body or put in place thereon when necessary.

Other objects will appear in the course of the following description.

Our invention is illustrated in the accompanying drawings, wherein—

Figure 1 is a side elevation of a poultry feeder constructed in accordance with our invention; Fig. 2 is a section on the line 2—2 of Fig. 1; Fig. 3 is a horizontal section across the receptacle 13 above the upper ends of the legs; Fig. 4 is an under side plan view of the valve 20; Fig. 5 is a fragmentary transverse section through the valve in the bottom of the hopper and showing in elevation the means for operating the valve; Fig. 6 is a section showing the manner of connecting the rod 27 to the shaft 25.

Referring to the drawings, 2 designates a substantially circular container or body divided into a plurality of compartments by intersecting walls 3, these compartments being segmental in form and of different sizes. As illustrated, there is provided at the lower end of the compartments the downwardly flaring conical bottom 4 and certain of the compartments have inwardly depressed portions 5 which extend down below the upper edges of the wall 6 and each extends upward from the lower portion of the floor 4. A water container 7 is disposed in one of these compartments. The floor 4 is supported upon a hollow base 8 within which a heater or lamp 9 is disposed. The upper end of the container 2 is closed by a removable conical cover or top 10. All of these parts are constructed in accordance with our patent above referred to, except as to the relative sizes of the compartments into which the body is divided.

Mounted upon the upper end of the body 2 and preferably mounted upon the cover 10 are the upwardly extending hollow or tubular supporting members 11, these members being preferably 3 in number and converging. Supported in superposed relation to the cover 10 and upon leg sections 12 is a grain receptacle 13 provided with a conical cover 14, this cover having marginal flanges extending over the grain receptacle so that rain cannot get into the grain receptacle. The lower end of the grain receptacle below the junction of the legs 12 with the receptacle is downwardly tapered to form a truncated hopper 15, the lower end of this hopper being closed by a plate 16 having an arcuate slot 17 cut in it adjacent the margin and provided with a plurality of perforations 19, these perforations preferably being arranged on each side of the center of the plate. Superposed between the plate and rotatable with relation thereto is a plate 20 also provided with a plurality of perforations 21 adapted to register with the perforations 19 in the plate 15 and provided adjacent its margin with an arcuate rack 22 adapted to project downward through the arcuate slot 17. Depending from the lower end of the hopper-shaped portion 15 are a plurality of hangers 23 supporting at their lower ends the upwardly extending conical distributer plate or spreader 24, the upper end of which is in spaced relation to the plate 16.

Rotatably mounted upon one of the legs 12 or in any other suitable manner is a shaft 25 carrying at its inner extremity the sector gear 26 which is adapted to mesh with the teeth on the rack 22. Depending from the outer end of this shaft 25 is a sectional pendulum rod, the upper end of which is designated 27. The lower section 28 is tubular and has telescopic relation with the upper section and is held in adjusted relation thereto by a set screw 29. The lower end of the pendulum carries a bob formed as a bait container, this bait container being designated 30. The bait container is preferably of wire mesh or some open material so that the bait contained therein may be plainly seen by the chickens.

The operation of the invention is evident from what has gone before. The poultry will peck at the bait within the basket or container 30 and this will cause the pendulum to swing, rotating the shaft and through the sector gear oscillating the plate 20. This will allow the grain to intermittently pass from the container 13 and be discharged downward on to the spreader 24 from which it slides on to the conical cover 10 and is discharged on to the ground. The height of the bait container from the ground may be very readily regulated either by raising or lowering the receptacle 13 or by lengthening or shortening the pendulum 27. By regulating the height from the ground and regulating the length of the pendulum, the amount of motion given to the valve plate 16 may be readily regulated. It will be noted that the pendulum will continue to swing a number of times after a single impulse given to it by poultry attempting to get the bait and this motion will cause grain to be distributed from the container 13 until the motion of the pendulum practically ceases. It will, of course, be understood that the pendulum may be weighted or that the bait alone may form the weight constituting the bob of the pendulum.

When it is desired to fill the compartments of the body 2, the cover 10 together with the grain receptacle 13 may be removed or the mechanism may be so constructed that the cover 10 may be removed without removing the receptacle 13.

It is to be understood that this device as described forms not only a means for feeding chickens but a means for exercising chickens. The bait holder 30 may be raised or lowered to a height just sufficient to cause the chickens to jump at the bait holder and this will cause the pendulum to swing and cause the discharge of grain. The height to which the chickens are caused to jump and therefore the amount of exercise which is given to the chickens may be regulated by adjusting the height of the bait holder. When it is not desired that the chickens shall have exercise the rod 27 may be removed entirely from the shaft 25. The bait holder has an opening through which bait may be inserted and is closed by any suitable door held in place by a latch. It will be seen that we have provided a combined fountain feeder and exerciser which is very convenient, simple in operation and construction, and which has been found very effective in the rearing of chickens.

Having thus described this invention, what we claim is:—

1. A feeding device for poultry comprising a receptacle having a hopper-shaped lower portion, the bottom of the receptacle being formed with perforations, legs extending from the receptacle, a shaft operatively supported upon the receptacle and extending out laterally beyond the same, a valve rotatably mounted upon the bottom of said receptacle and controlling the passage through said perforations, said valve being operatively engaged by the shaft for oscillation, and a pendulum depending from the outer end of the shaft and having a bait holder at its lower end.

2. A poultry feeding device comprising a receptacle formed with a perforated bottom, a grain scatterer disposed below the bottom, a horizontally disposed rotatable valve mounted upon the bottom of the receptacle and controlling the passage of grain through the perforations, a shaft operatively supported upon the receptacle and extending out laterally beyond the receptacle, the inner end of the shaft being operatively connected to the valve to oscillate it upon an oscillation of the shaft, a pendulum detachably connected to the shaft and a bait holder mounted upon the lower end of the pendulum.

3. A feeding device for poultry comprising a receptacle having a hopper-shaped lower portion, the bottom of said lower portion being formed with perforations, legs extending from the receptacle, each leg being formed in two vertically adjustable sections whereby the height of the receptacle may be adjusted, a shaft rotatably supported upon a leg, a valve rotatably mounted upon said bottom and operatively engaged by said shaft for oscillation thereby, and a pendulum depending from the shaft and having a bait holder at its lower end.

4. A feeding device for poultry comprising a receptacle having a hopper-shaped lower portion, the bottom of said portion being formed with perforations, legs extending from the receptacle, each leg being formed in two vertically adjustable sections whereby the height of the receptacle may be adjusted, a shaft rotatably supported upon a leg, a valve rotatably mounted upon the bottom and operatively engaged by said shaft for oscillation thereby, and a pendulum depending from the shaft and having a bait holder at its lower end, said pendulum being formed of two longitudinally adjustable sections.

5. In a poultry feeder, the combination with a body having a conical top, of a receptacle disposed above and mounted upon said body, and having a hopper-shaped lower portion, the bottom of said hopper-shaped portion being formed with perforations, a rotatable valve mounted upon said bottom and controlling the passage through said perforations, a pendulum, a shaft to which the pendulum is connected, and means on the shaft for oscillating said valve, the conical top of said body acting to distribute the grain discharged through said receptacle.

6. The combination with a feed receptacle having a conical top, of tubular members extending upward from the receptacle, a grain receptacle mounted directly above said conical top and having legs extending into said tubular members and vertically adjustable therein, said grain receptacle having a hopper-shaped lower portion formed with a perforated bottom, a rotatable valve mounted upon said bottom and controlling the discharge therethrough, a shaft mounted upon a leg and having a sector gear at its inner end operatively engaging with said rotatable valve to oscillate it, and a pendulum mounted upon said shaft and adjustable for length, said pendulum carrying a bait holder at its lower end.

In testimony whereof we hereunto affix our signatures in the presence of two witnesses.

LEO M. ANDERSON.
MARY L. ANDERSON.

Witnesses:
CARL M. RUSSELL,
ANDREW I. SPEAR.

Copies of this patent may be obtained for five cents each, by addressing the "Commissioner of Patents, Washington, D. C."